(12) United States Patent
Knapp

(10) Patent No.: US 8,813,462 B2
(45) Date of Patent: Aug. 26, 2014

(54) DEVICE AND METHOD FOR PRODUCING PLASTIC CONTAINERS AND PLASTIC CONTAINERS PRODUCED BY SAID METHOD

(75) Inventor: Peter Knapp, Schmatzhausen (DE)

(73) Assignee: Krones AG, Neutraubling (DE)

( * ) Notice: Subject to any disclaimer, the term of this patent is extended or adjusted under 35 U.S.C. 154(b) by 302 days.

(21) Appl. No.: 13/131,849

(22) PCT Filed: Nov. 25, 2009

(86) PCT No.: PCT/EP2009/065802
§ 371 (c)(1),
(2), (4) Date: May 27, 2011

(87) PCT Pub. No.: WO2010/060919
PCT Pub. Date: Jun. 3, 2010

(65) Prior Publication Data
US 2011/0232237 A1 Sep. 29, 2011

(30) Foreign Application Priority Data
Nov. 28, 2008 (DE) .......................... 10 2008 059 624

(51) Int. Cl.
*B65B 3/02* (2006.01)
*B29C 49/30* (2006.01)
*B29D 22/00* (2006.01)

(52) U.S. Cl.
USPC .................... 53/452; 53/433; 53/511; 53/559; 141/82; 264/535; 425/526

(58) Field of Classification Search
USPC ............ 53/433, 452, 511, 559, 561; 425/524, 425/526; 264/535
See application file for complete search history.

(56) References Cited

U.S. PATENT DOCUMENTS

| | | | | |
|---|---|---|---|---|
| 4,276,987 A | | 7/1981 | Michel | |
| 4,519,977 A | * | 5/1985 | Kawaguchi et al. | 264/550 |
| 4,615,928 A | * | 10/1986 | Kawaguchi et al. | 428/36.92 |
| 5,520,877 A | * | 5/1996 | Collette et al. | 264/521 |
| 5,585,065 A | * | 12/1996 | Nakamaki et al. | 264/521 |
| 5,829,614 A | * | 11/1998 | Collette et al. | 215/375 |
| 5,851,478 A | * | 12/1998 | Iizuka et al. | 264/520 |
| 5,888,598 A | * | 3/1999 | Brewster et al. | 428/35.7 |
| 6,926,859 B2 | * | 8/2005 | Collette et al. | 264/521 |
| 7,445,826 B2 | * | 11/2008 | Collette et al. | 428/35.7 |
| 8,517,711 B2 | * | 8/2013 | Winzinger | 425/174.4 |
| 2005/0271843 A1 | | 12/2005 | Collette et al. | |

FOREIGN PATENT DOCUMENTS

EP  0 244 128 A2  11/1987
GB  2 009 029 A  6/1979

* cited by examiner

*Primary Examiner* — Hemant M Desai
(74) *Attorney, Agent, or Firm* — Novak Druce Connolly Bove + Quigg $^{LLP}$

(57) ABSTRACT

A device for molding plastic blanks to give plastic containers with a blow mold may include a cavity within which a plastic blank may be molded to give a plastic container. The blow mold has a base part to form a base section of the container. The base part defines the cavity. The device may include a filling device for introducing a gaseous medium into the plastic blank via the mouth thereof, in order to expand the plastic blank within the blow mold, with a rod-like body, which may be moved relative to the blow mold in order to draw the plastic blank during the molding process. The base part has a forming section defining the cavity, for forming the base section of the container which matches the shape of the base section of the container, and the forming section has a projection running in the direction of the cavity in a central region.

5 Claims, 3 Drawing Sheets

DEVICE AND METHOD FOR PRODUCING PLASTIC CONTAINERS AND PLASTIC CONTAINERS PRODUCED BY SAID METHOD

CROSS-REFERENCE TO RELATED APPLICATION

This application is filed under 35 U.S.C. 371 as a U.S. national phase application of PCT/EP2009/065802, having an international filing date of Nov. 25, 2009, which claims the benefit of German Patent Application No. 10 2008 059 624.8, having a filing date of Nov. 28, 2008, both of which are hereby incorporated by reference.

TECHNICAL FIELD

The present invention relates to a device for production of plastic containers and in particular to a device for moulding plastic preforms into plastic containers. In addition the invention is also directed at a corresponding production method for plastic containers and to a plastic container produced by such a method.

BACKGROUND

Various devices and methods for moulding plastic preforms into plastic containers have been known from the prior art for some time. It is normal in the prior art first generate these plastic preforms in a blow moulding process and then fill them with a fluid, in particular a drink. Also different variants of this filling process are conceivable. Thus for example so-called cold filling is possible, wherein it is particularly relevant that the containers produced are pressure-resistant. Furthermore a method of hot filling is known from the prior art, i.e. in this method the drinks are poured into the containers in a greatly heated state. In this method the containers must be vacuum-resistant as on cooling of the bottle, the volume reduces. This bottle must be able to compensate for this volume reduction. Thus normally with this filling method, the bottle weight of the preform is higher than in cold filling.

U.S. Pat. No. 4,276,987 discloses a hollow body made from a thermoplastic material. EP 0 244 128 describes blow-moulded containers. A central area of these containers is fitted with a recess which is formed by a peripheral wall and base wall.

In a method used internally by the applicant, the containers are filled with medium at a temperature of 85° C. for example, then pressurised with nitrogen and sealed. Immediately after sealing the pressure in the bottle rises. It must firstly be guaranteed that the container does not deform during the filling phase with hot medium, and after sealing the container must be able to compensate for a pressure of for example up to 2 bar. However according to the prior art the problem arises here that the base can bulge, clearly reducing the base clearance present in the container, which again can mean that the containers wobble or stand tilted.

It may be desirable to provide devices and methods for production of plastic containers which simplify subsequent hot filling of the container.

SUMMARY

A device according to the invention for moulding plastic preforms into plastic containers has a blowing mould which in turn forms a cavity with an inner wall facing the plastic container, within which a plastic preform can be moulded into a plastic container. The blowing mould has a base part to form the base section of a container, this base section delimiting the cavity. Furthermore the device has a filling device to supply a gaseous medium to the plastic preform via its opening in order to expand the plastic preform inside the blowing mould. Furthermore the blowing mould has a rod-like body which is mobile in relation to the blowing mould in order to stretch the plastic preform during the moulding process. The filling device can for example be a blow nozzle which is applied to the mouth of the container in order to supply gaseous medium into the container.

According to the invention the base part has a structuring section delimiting the cavity and forming part of the inner wall, which section serves to structure the base surface of the container and is adapted to a geometric shape of the base surface of the finished container. Furthermore the base part in a central area has a protrusion extending in the direction of the cavity, wherein the inner wall facing the plastic container can be heated or warmed at least in sections. In particular at least the side parts of the blowing mould can be heated. The base part can also be heated but it would also be possible for the base part not to be heated, or even to be cooled. In general therefore said inner wall can be tempered at least in sections.

Preferably this protrusion is arranged such that during an expansion process at least part of the time it lies against an injection point of the container.

The blowing mould comprises, in particular next to the base part, side parts which also delimit the container. In this embodiment it is proposed that at least one area of this inner wall is heated, i.e. the side parts and/or the base part.

This achieves that said injection point which is normally present in these plastic preforms is pressed slightly into the interior of the resulting container during the expansion process. For the subsequent filling process with a hot drink, it is achieved that on expansion of the container, the injection point no longer reduces the base clearance of the container as it is pressed inward in relation to the interior of the container.

In the prior art, usually on production of the bottle the injection point of the pre-mould is pressed as a recess into the base part or the base cup. Thus it is proposed according to the invention that this recess be converted into a projection or said protrusion or pin. This achieves firstly as stated greater base clearance and secondly in relation to the method a fixing is achieved in the base centre of the container. Particular advantages arise in particular from combination with heating the inner wall of the plastic container, as this achieves a high stability of the container in particular in the area of the injection point.

With this procedure an improvement can be achieved in relation to the base clearances previously attained. Preferably said structuring section of the base part is formed such that a protrusion on any plane containing a longitudinal axis of the blowing mould or container, assumes a continuous or in mathematical terms differentiable course, with the exception of said central area in which the protrusion extends.

In a preferred embodiment the rod-like body or rod body in its interior has a channel extending in the longitudinal direction of the rod-like body to transport a gaseous medium. The rod-like body, which is sometimes also called a stretch rod, is thus in this preferred embodiment formed as a so-called flushing rod which allows the application of a gaseous medium, for example hot air, to a base part of the preform. This method thus contributes to the stability of the container in the region of the injection point.

Preferably here the inner wall of the blowing mould has channels for the transport of a fluid. Thus for example hot oil can be transported through the inner wall of the blowing mould to heat this to the specified temperature. This heating of the blowing mould brings benefits for the container production process but also for the subsequent container filling process. In particular a combination of such a heatable inner wall with said protrusion, as stated above, has particular advantages in a system in which the container produced in this way is subsequently to be filled with a hot drink.

In a further advantageous embodiment said protrusion has a flat surface. This means that the surface facing the preform or container is formed substantially flat. This surface can for example assume the shape of a flat circle surface. The surface can however also have rounded side edges.

In a further preferred embodiment said protrusion, in relation to the structuring section in a region about the protrusion, has a height which lies between 0.2 mm and 10 mm, preferably between 0.4 mm and 8 mm and particularly preferably between 0.7 mm and 1.5 mm. Extensive experiments by the applicant on widely varying preforms and materials have shown that said height is particularly suitable firstly for not straining the generation of the container in the base area but secondly for achieving a precise satisfactory expansion of the container during hot filling. Preferably said height of the protrusion can be changed.

The present invention is furthermore directed at a plant for production of containers filled with fluids, which comprises a device of the type described above for forming plastic preforms into plastic containers, and a filling unit arranged after said device in a transport direction of the containers, which unit fills the containers with a fluid, wherein this filling unit is structured such that it adds the fluid in a heated state to the container. In particular the plant has a heating device for the fluid to be filled which heats the fluid before it enters the container.

Preferably the plant is structured such that the fluid is filled at a temperature which lies between 50° and 100°, preferably between 60° and 90° and particular preferably between 80° and 90°.

In a further advantageous embodiment the filling unit has a gas supply device which supplies a gaseous medium to the container after it has been filled with fluid. As stated above, immediately after hot filling of the drink a gas, for example nitrogen, can be supplied and then the container sealed. In this way the effects which occur on contraction of the fluid can be compensated without the container shrinking visually perceptibly.

The present invention is furthermore directed at a method for forming plastic preforms into plastic containers, wherein the plastic preforms are arranged in a cavity formed within a blowing mould, and within this cavity moulded into plastic containers in particular by expansion against an inner wall of the blowing mould. Here a gaseous medium is supplied by means of a filling device to the plastic preform for its expansion during the moulding process and the plastic preform is thus expanded also against part of the structuring section of the base part forming the inner wall of the blowing mould in order to form a base section of the container. According to the invention a central region of the plastic preform is expanded against a protrusion formed on the structuring section and extending in the direction of the cavity, and the inner wall of the blowing mould facing the plastic preform is heated at least in sections to perform the moulding process. In particular the side wall of the blowing mould is heated. Heating of the base part is not absolutely essential, depending on application even cooling of the base part could be considered.

In a preferred method the plastic preform is expanded in its longitudinal direction during the moulding process by means of a rod-like body introduced into the interior of the plastic preform. Particularly preferably at least part of the time during the moulding process a gaseous medium is supplied to the plastic container through the rod-like body, i.e. here particularly preferably a flushing rod is used.

In a further advantageous method in a first method step a plastic container is produced in the manner described above and then the container filled with a fluid, wherein the temperature of this fluid during filling lies above 30° C., preferably above 50° C. Particularly advantageously the fluid is supplied to the container (under pressure) at this time or a gas is supplied to the container after the fluid.

More precisely after or during filling with fluid, a gaseous medium is supplied to the container and then the container is sealed.

BRIEF DESCRIPTION OF THE DRAWINGS

Further advantages and embodiments arise from the enclosed figures. These show:

FIG. 1b a detail of the depiction shown in FIG. 1a;

FIG. 4a a detailed depiction of the device in FIG. 3a;

FIG. 5 a detailed depiction of the area D shown in FIG. 4a; and

DETAILED DESCRIPTION

Figure 1A:
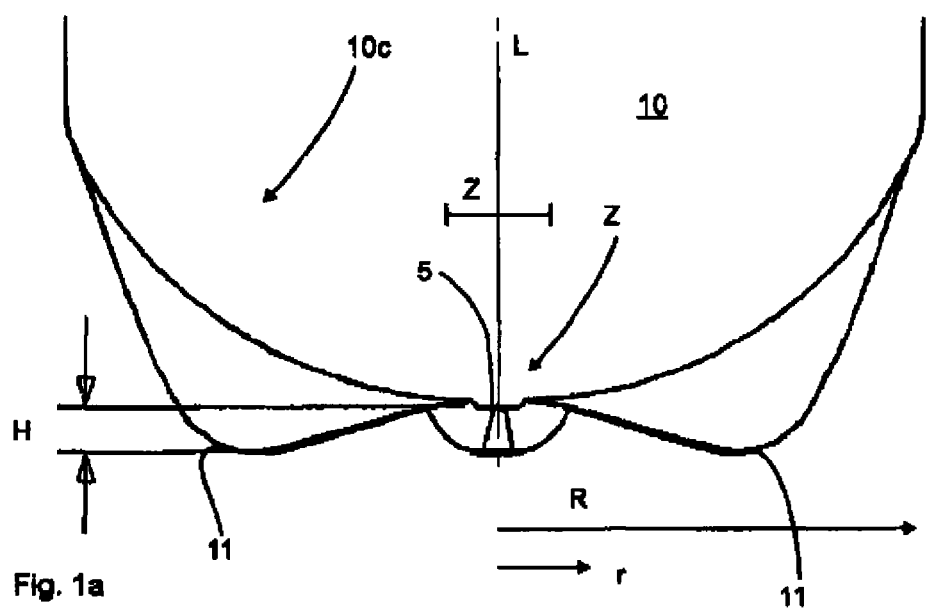
FIG. 1a a part view of a container according to the prior art.

FIG. 1a shows a part view of a container 10, more precisely a base area 10c of this container 10. This base area 10c has a multiplicity of feet 11. In a radially inner area of these feet is an injection point 5 which occurs even on the preforms which will subsequently be moulded into the containers 10 shown in FIG. 1a. Reference numeral H indicates a height difference between the underside of the feet 11 and the underside of this injection point 5. This injection point 5 is thus arranged in a central region designated Z as a whole of the base 10c. The central region has a circular cross section.

Figure 1B:
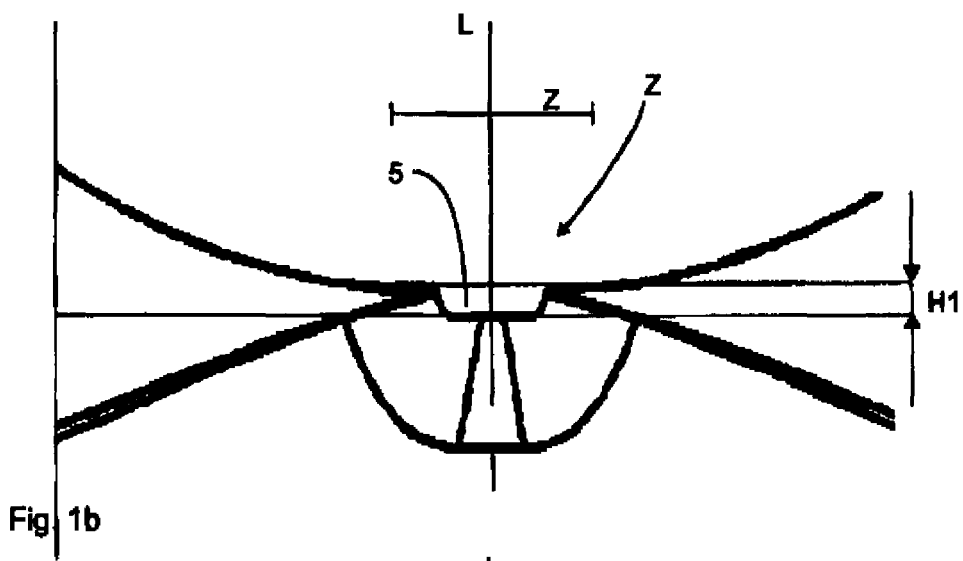

FIG. 1b shows a detail of the base shown in FIG. 1a, more precisely the central region Z and its surrounding regions. Reference numeral H1 designates the height of the injection point in relation to the actual surface 13 of the base.

If now a corresponding container is filled with a gas in the filling process and expands, this can lead to the injection point 5 moving down so far that height H shown in FIG. 1a is reduced to 0, or even the injection point protruding downward. This leads to the container wobbling or no longer standing straight.

In the method known from the prior art, on moulding or production of the container 10 said injection point 5 is pressed into a base cup.

Figure 2:
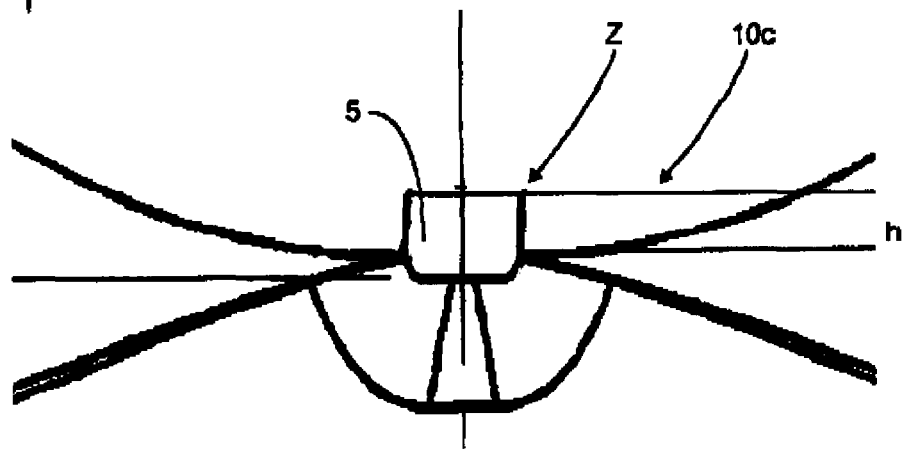
FIG. 2 a detailed depiction of a container according to the invention.

FIG. 2 shows the corresponding detailed depiction of a container according to the invention or its base area 10c. Here it is evident that the injection point 5, in contrast to the depiction shown in FIG. 2a, has been pressed up by area h. This can be achieved in that instead of the recess mentioned above in the base cup, a protrusion is used, referred to below as PIN. In this way firstly more base clearance is achieved and secondly in the method a fixing is achieved in the base centre Z. Thus the innovation according to the invention achieves substantially more base clearance for the container than with the previously known method. Said method brings particular advantages in plants for hot filling of drinks or in forming devices in which a wall of the blowing mould is heated, as here said upward shift of the injection point is possible particularly advantageously.

Figure 3A:
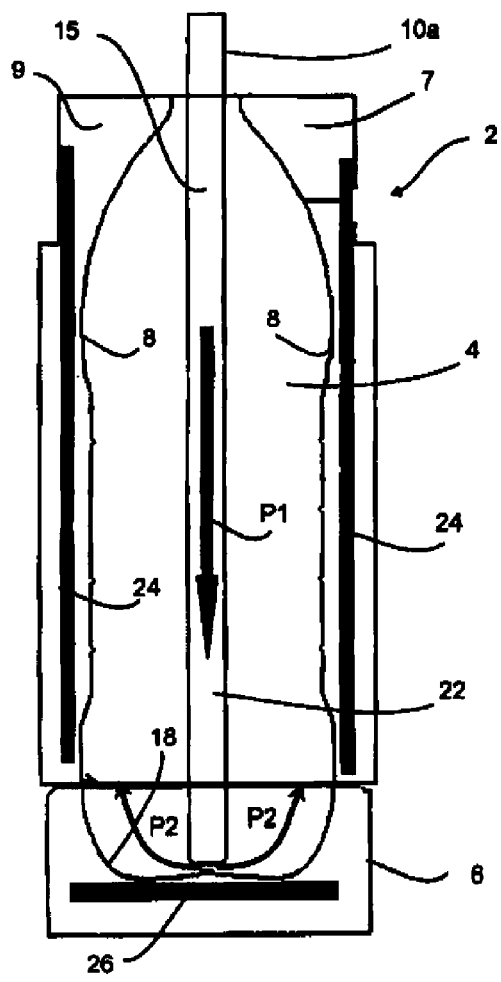
FIG. 3a a diagrammatic depiction of a device for production of containers.

FIG. 3a shows a depiction of a blowing mould 2 according to the invention without container. This blowing mould has a first mould part 7 and a second mould part 9 which can be closed against each other and form a cavity 4 in the interior. This cavity 4 is limited by the inner walls 8 of the two mould parts 7, 9. The cavity is limited at the bottom by a base part 6 which also has an inner wall 18 to form the base area of the container. Heating devices 24 are accommodated in both mould parts 7 and 9 in order to be able to heat the inner wall 8. Preferably these are channels through which a heating medium, in particular liquid, can be directed. Also a corresponding heating device 26 is formed in the base part 6, this heating device 26 being formed by channels through which also can flow a liquid heating agent such as for example oil.

Reference numeral 15 relates to a rod-like body for stretching a container in its longitudinal direction L. This rod-like body 15 is here formed as a flushing rod which means that along arrow P1, a gaseous medium such as for example air can be guided into the lower part of the container or blowing mould 2. This gaseous medium then travels up again along arrow P2.

Figure 3B:
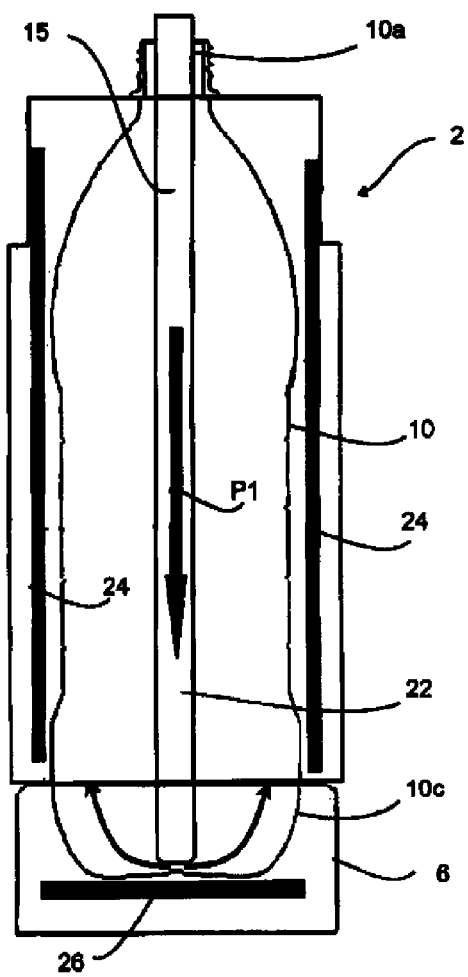
FIG. 3b a diagrammatic depiction of the device of FIG. 3a with inserted container.

FIG. 3b shows a corresponding depiction with a container 10 arranged in the blowing mould 2. It must be noted that the inner walls 8, 18 form the negative for the bottle or container 10 to be produced. Above the blowing mould can be seen a thread 10a of the container 10 which is deliberately not touched during the expansion process.

Figure 4A:
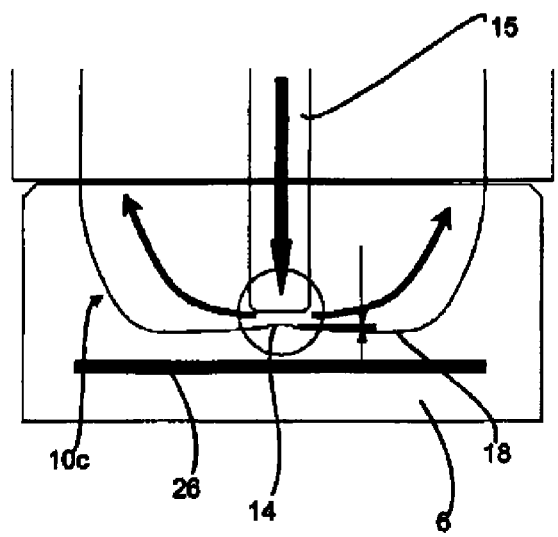

FIG. 4a shows a detailed view of the base area 6 of a blowing mould 2 according to the invention. Here in particular can be seen a protrusion 14 according to the invention which protrudes up in relation to the base section 18. The base section 18 is curved outside this protrusion 14 and in particular a corresponding curvature of the base section always has the same prefix.

Figure 4B:
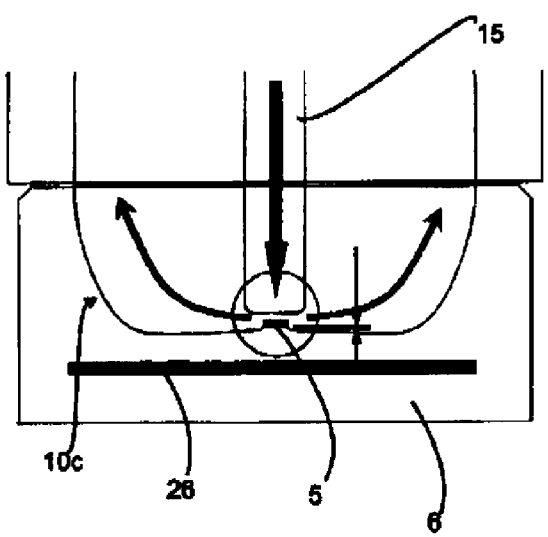
FIG. 4b a detailed depiction of the device in FIG. 3b.

FIG. 4b shows a corresponding depiction of a container to be formed. It is evident that here the injection point 5 of the container is pushed up by the protrusion 14 shown in FIG. 4a.

Figure 5:
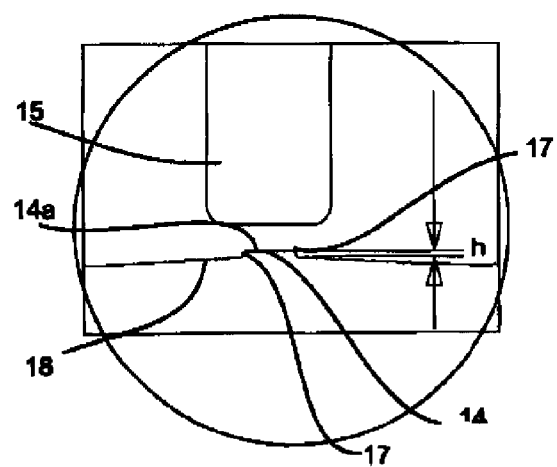

FIG. 5 shows a detailed view of the blowing mould shown in FIG. 4a. Here the protrusion 14 can be seen more precisely, the surface 14a of which is formed flat whereby shifting of the injection point 5 can be further improved. In extensive tests it has been found that an advantageous height h of this protrusion is between 1 mm and 10 mm, preferably between 2 mm and 8 mm and particularly preferably between 5 mm and 8 mm. The protrusion 14 is here formed on one side with the inner wall 18. It would however also be possible to form the protrusion 14 mobile in relation to the inner wall 18 in order thus to make the height h of the protrusion 14 adjustable.

Furthermore between the inner wall 18 of the base part 6 and the protrusion 14 is a relatively steep transition 17. This achieves that the area containing the injection point is pressed selectively upwards.

Figure 6:
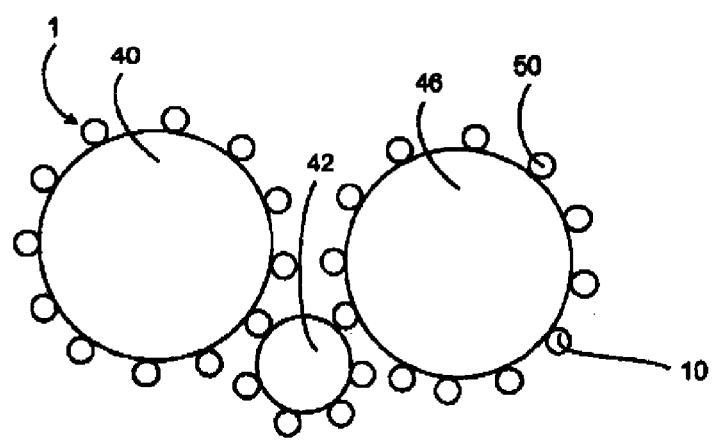
FIG. 6 a highly diagrammatic depiction of a plant according to the invention for production of containers filled with drinks.

FIG. 6 shows a greatly diagrammatic depiction of a plant 60 according to the invention for production of containers. Reference numeral 40 indicates a device for moulding the preforms into containers 10 and in particular a stretch blow moulding machine. This stretch blow moulding machine 40 has a multiplicity of devices for moulding plastic preforms into plastic containers 10 which form the individual containers 10. The plant 40 is thus designed as a carousel system.

The containers produced in the plant 40 are transferred by a transport device 42 such as star wheel to a filler unit 46. Instead of the star wheel shown in FIG. 6 however other transport devices can be used such as for example pneumatic conveyors and similar. In the filling device 46 the containers 10 are filled with a liquid drink. The drink is first heated and filled at a high temperature.

It would for example also be possible to use heating devices in the manner of a passage heater which heats the drink and the filling devices 50 such as nozzle heads which add the drink to the containers 10. The filling device 46 has a filing device (not shown) for gaseous medium which after filing with the drink adds said gaseous medium to the containers 10. After this filling process the containers are sealed with caps by a closing device (not shown). Inside the container 10 firstly the drink introduced contracts as a result of cooling and secondly the gas added expands. In this way in total a volume or pressure increase can be achieved inside the container which leads to the injection point shown in FIG. 4b being pressed slightly down.

As however the injection point has first been pressed up by the blowing mould 2, this achieves that as a result the injection point does not hinder the standing stability of the container 10 produced and filled in this way.

All features disclosed in the application documents are claimed as essential to the invention where novel individually or in combination in relation to the prior art.

What is claimed is:

1. Device for moulding plastic preforms into plastic containers, comprising:
    a blowing mould with an inner wall facing the plastic container, which blowing mould has a cavity within which a plastic preform can be formed into a plastic container, the blowing mould having a base part to form a base section of the container, said base part comprising a structuring section delimiting said cavity and forming part of the inner wall, said structuring section serving to structure the base section of the container, the structuring section being adapted to a shape of the base section of the finished container, the structuring section having a protrusion in a central region, said protrusion extending in the direction of the cavity and being arranged such that during an expansion process the protrusion lies on an injection point of the container;
    a filling device to supply a gaseous medium to the plastic preform via a mouth of the preform in order to expand the plastic preform inside the blowing mould; and
    a rod-like body which is mobile in relation to the blowing mould to stretch the plastic preform during the moulding process,
    wherein the inner wall of the blowing mould facing the plastic preform can be heated at least in sections.

2. Device according to claim 1, wherein the rod-like body has a channel extending in its interior in the longitudinal direction of the rod-like body for transport of a gaseous medium.

3. Method for moulding plastic preforms into plastic containers, comprising:
    arranging at least one plastic preform in a cavity formed inside a blowing mould;
    moulding said at least one plastic preform, within said cavity, into plastic containers by expansion against an inner wall of the blowing mould, the plastic preform being expanded against a structuring section of the blowing mould forming a part of the inner wall to form a base section of the container, a central region of the plastic preform being expanded against a protrusion formed on a structuring section, the protrusion extending in the direction of the cavity and being arranged such that during an expansion process the protrusion lies on an injection point of the container;

heating the inner wall of the blowing mould facing the plastic preform at least in sections for performance of the moulding process; and supplying a gaseous medium to the plastic preforms by means of a filling device during the moulding process.

4. Method according to claim 3, wherein the plastic preform during the moulding process is expanded in its longitudinal direction by means of a rod-like body.

5. Method according to claim 3, wherein a gaseous medium is supplied through the rod-like body to the plastic container for at least part of the time during the moulding process.

* * * * *